(12) United States Patent
Porter et al.

(10) Patent No.: US 10,718,519 B2
(45) Date of Patent: Jul. 21, 2020

(54) COMBUSTOR PANEL STANDOFF PIN

(71) Applicant: UNITED TECHNOLOGIES CORPORATION, Farmington, CT (US)

(72) Inventors: Steven D Porter, Wethersfield, CT (US); James Tilsley Auxier, Bloomfield, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 227 days.

(21) Appl. No.: 15/893,324

(22) Filed: Feb. 9, 2018

(65) Prior Publication Data
US 2019/0249873 A1 Aug. 15, 2019

(51) Int. Cl.
F23R 3/00 (2006.01)
F23R 3/06 (2006.01)
F23R 3/60 (2006.01)
F23R 3/50 (2006.01)

(52) U.S. Cl.
CPC ............ *F23R 3/002* (2013.01); *F23R 3/06* (2013.01); *F23R 3/50* (2013.01); *F23R 3/60* (2013.01); *F05D 2260/231* (2013.01); *F23R 2900/00005* (2013.01); *F23R 2900/00017* (2013.01); *F23R 2900/03041* (2013.01); *F23R 2900/03044* (2013.01); *F23R 2900/03045* (2013.01)

(58) Field of Classification Search
CPC .... F23R 3/002; F23R 3/06; F23R 3/60; F23R 2900/00017; F23R 2900/03045
See application file for complete search history.

(56) References Cited

U.S. PATENT DOCUMENTS

| | | | |
|---|---|---|---|
| 2009/0013530 A1* | 1/2009 | Rudrapatna | F23R 3/002 29/888 |
| 2010/0095680 A1 | 4/2010 | Rudrapatna et al. | |
| 2014/0190166 A1* | 7/2014 | Pidcock | F23R 3/002 60/722 |
| 2016/0313005 A1 | 10/2016 | Chang et al. | |
| 2017/0205069 A1* | 7/2017 | Tentorio | F23R 3/002 |

FOREIGN PATENT DOCUMENTS

| | | |
|---|---|---|
| EP | 1363075 | 11/2003 |
| WO | 2015047509 | 4/2015 |
| WO | 2015147938 | 10/2015 |

OTHER PUBLICATIONS

European Patent Office, European Search Report dated Mar. 27, 2019 in Application No. 19155605.9.

* cited by examiner

*Primary Examiner* — Todd E Manahan
*Assistant Examiner* — Katheryn A Malatek
(74) *Attorney, Agent, or Firm* — Snell & Wilmer, L.L.P.

(57) ABSTRACT

A heat shield panel for use in a gas turbine engine combustor is disclosed. The heat shield panel includes a hot side, a cold side and at least one attachment mechanism having a stud and a central axis extending through the stud and a plurality of standoff pins positioned circumferentially around the stud, the standoff pins having a radial extent, a circumferential extent that is greater than the radial extent, a radially outer surface having a radially convex shape and a radially inner surface having a radially concave shape.

17 Claims, 7 Drawing Sheets

COMBUSTOR PANEL STANDOFF PIN

FIELD

The present disclosure relates to gas turbine engines and, more particularly, to effusion panels or liners used in the combustors of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more panels and one or more shells. Cooling cavities reside between the panels and the shells. The cooling cavities fluidly couple impingement apertures defined in the shells with effusion apertures defined in the panels.

SUMMARY

A heat shield panel for use in a gas turbine engine combustor is disclosed. In various embodiments, the heat shield panel includes a hot side, a cold side and at least one attachment mechanism, the at least one attachment mechanism having a stud and a central axis extending through the stud and a plurality of standoff pins positioned circumferentially around the stud, the standoff pins having a radial extent, a circumferential extent that is greater than the radial extent, a radially outer surface having a radially convex shape and a radially inner surface having a radially concave shape.

In various embodiments, the radially outer surface is defined by an outer radius of curvature. In various embodiments, the radially inner surface is defined by an inner radius of curvature. In various embodiments, the inner radius of curvature has an inner value with respect to the central axis and the outer radius of curvature has an outer value and the outer value is greater than the inner value. In various embodiments, the radially outer surface is substantially arcuate and straight-sided. In various embodiments, the radially inner surface is substantially arcuate and straight-sided.

In various embodiments, the standoff pins include a contact surface and a transition portion connecting the contact surface to the radially outer surface and the radially inner surface. In various embodiments, the transition portion includes a transition height and a transition width. In various embodiments, the transition height and the transition width are substantially constant about an outer periphery of the standoff pins. In various embodiments, the standoff pins are separated by a standoff spacing in a circumferential direction. In various embodiments, the standoff pins have an axial height and the standoff spacing has a value greater than the axial height. In various embodiments, the standoff pins have a circumferential dimension having a value within a range from about two times the standoff spacing to about three times the standoff spacing.

A heat shield liner for use in a gas turbine engine combustor is disclosed. In various embodiments, the heat shield liner includes a panel having a hot side and a cold side and at least one attachment mechanism connected to the cold side of the panel, the at least one attachment mechanism having a stud and a plurality of standoff pins positioned circumferentially around the stud. The standoff pins have a circumferential extent and are separated by a standoff spacing in a circumferential direction, and the circumferential extent of the standoff pins has a value from about two times to about three times the standoff spacing.

In various embodiments, the heat shield liner further includes a shell and the panel is secured to the shell by the at least one attachment mechanism and the plurality of standoff pins include a contact surface abutting the shell. In various embodiments, the plurality of pins have an oval cross sectional shape in an axial direction with respect to the stud. In various embodiments, the oval cross sectional shape has a radial extent less than the circumferential extent.

A heat shield panel for use in a gas turbine engine combustor is disclosed. In various embodiments, the heat shield panel includes a hot side, a cold side and at least one attachment mechanism. In various embodiments, the at least one attachment mechanism includes a stud and a plurality of standoff pins positioned circumferentially around the stud, the standoff pins having a height. In various embodiments, the standoff pins are separated there between by a standoff spacing and the height of the standoff pins is less than the standoff spacing by a ratio of between approximately one and two.

In various embodiments, the standoff pins have an oval cross sectional shape in an axial direction with respect to the stud. In various embodiments, the standoff pins have a cross sectional shape defined by a radially outer surface having a radially convex shape and a radially inner surface having a radially concave shape. In various embodiments, the standoff pins have a radial dimension having a value within a range from about one times the standoff spacing to about two times the standoff spacing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
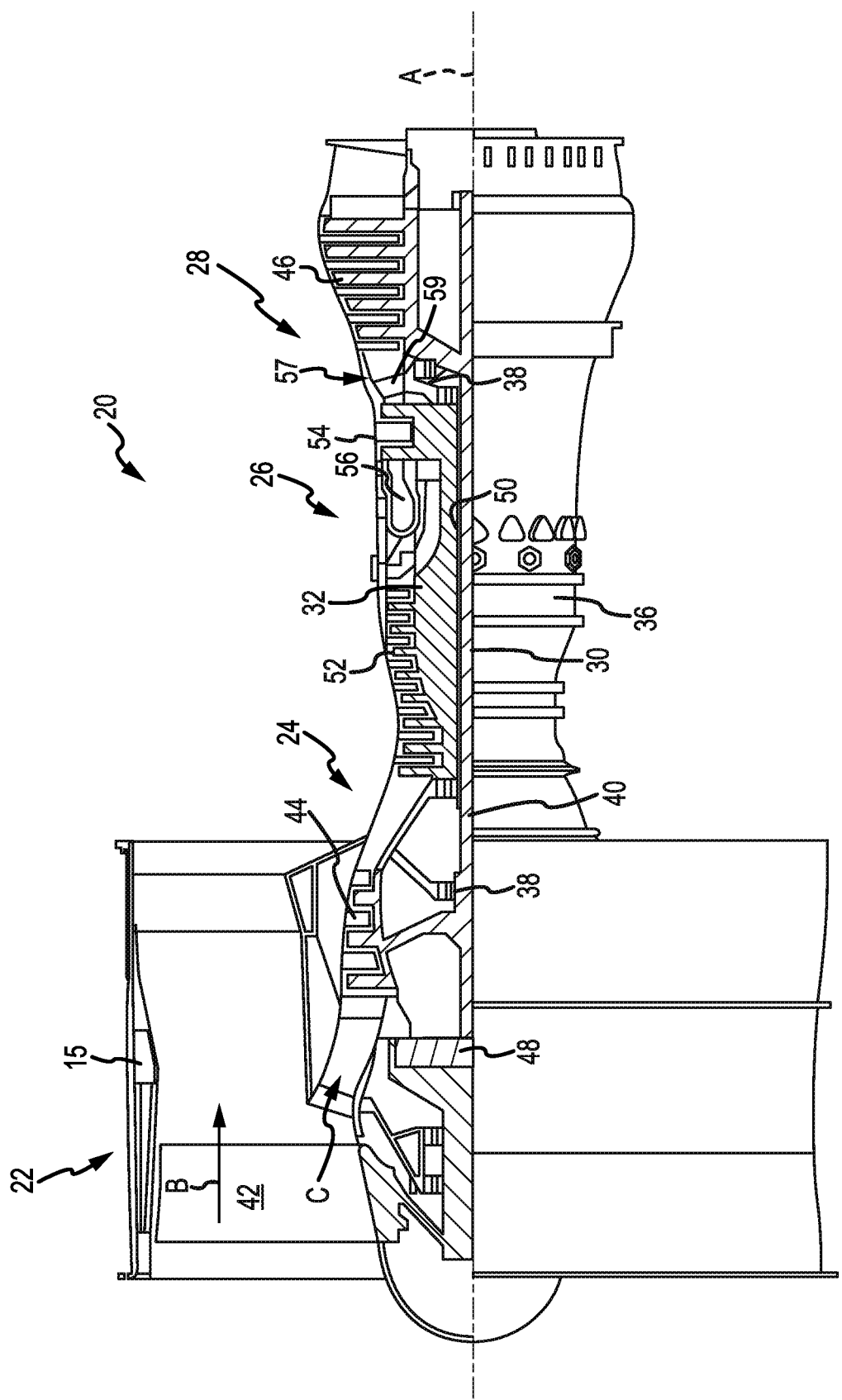
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
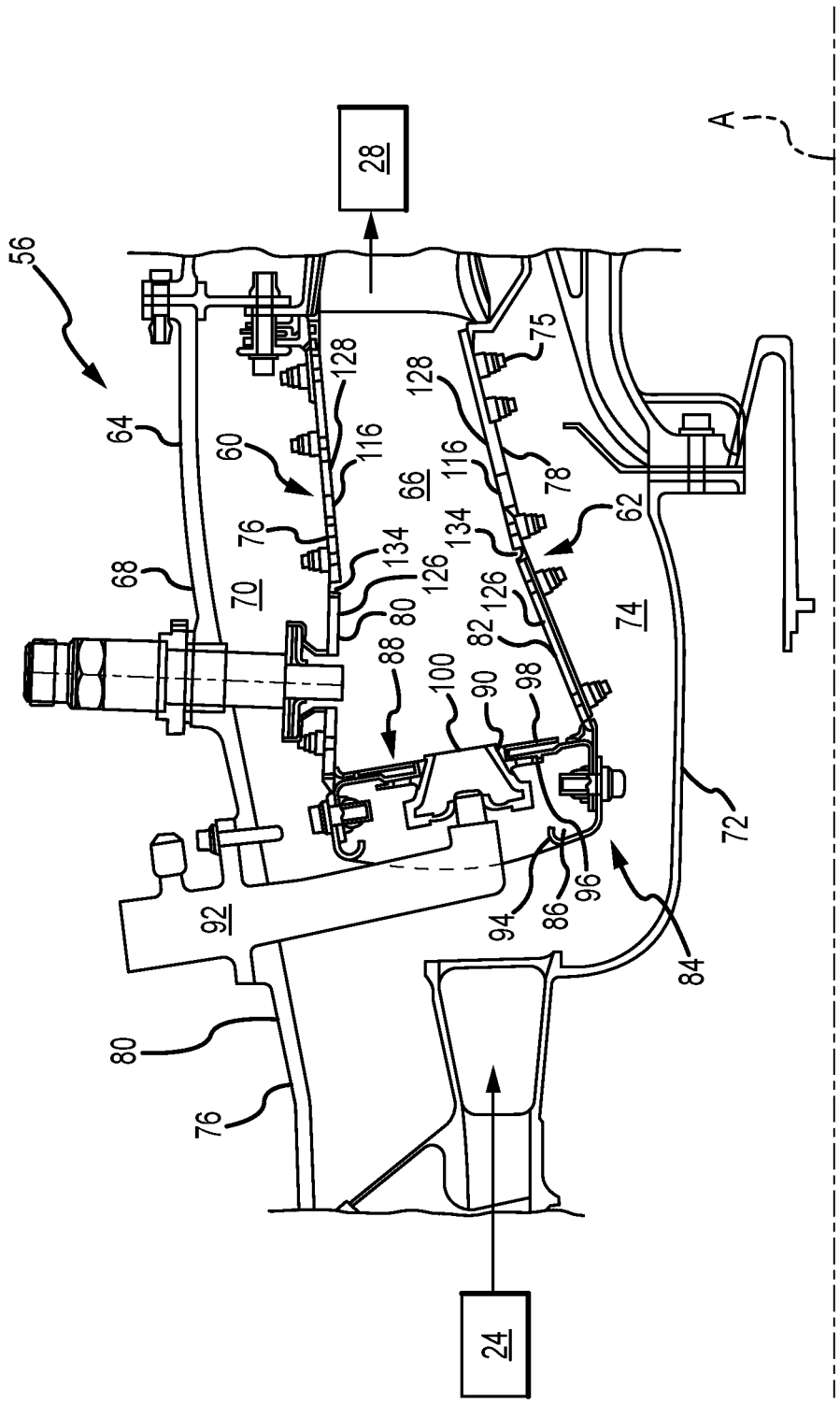
FIG. 1B is a cross sectional schematic view of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure. It should be further understood that the disclosed cooling flow paths are but an illustrated embodiment.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, a bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces core compressed air into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum is also introduced into the combustion chamber 66 via a plurality of orifices 116, which may include dilution holes or air feed holes of various dimension. The outer support shell 76 may also include a plurality of impingement holes (discussed further below) that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 1C:
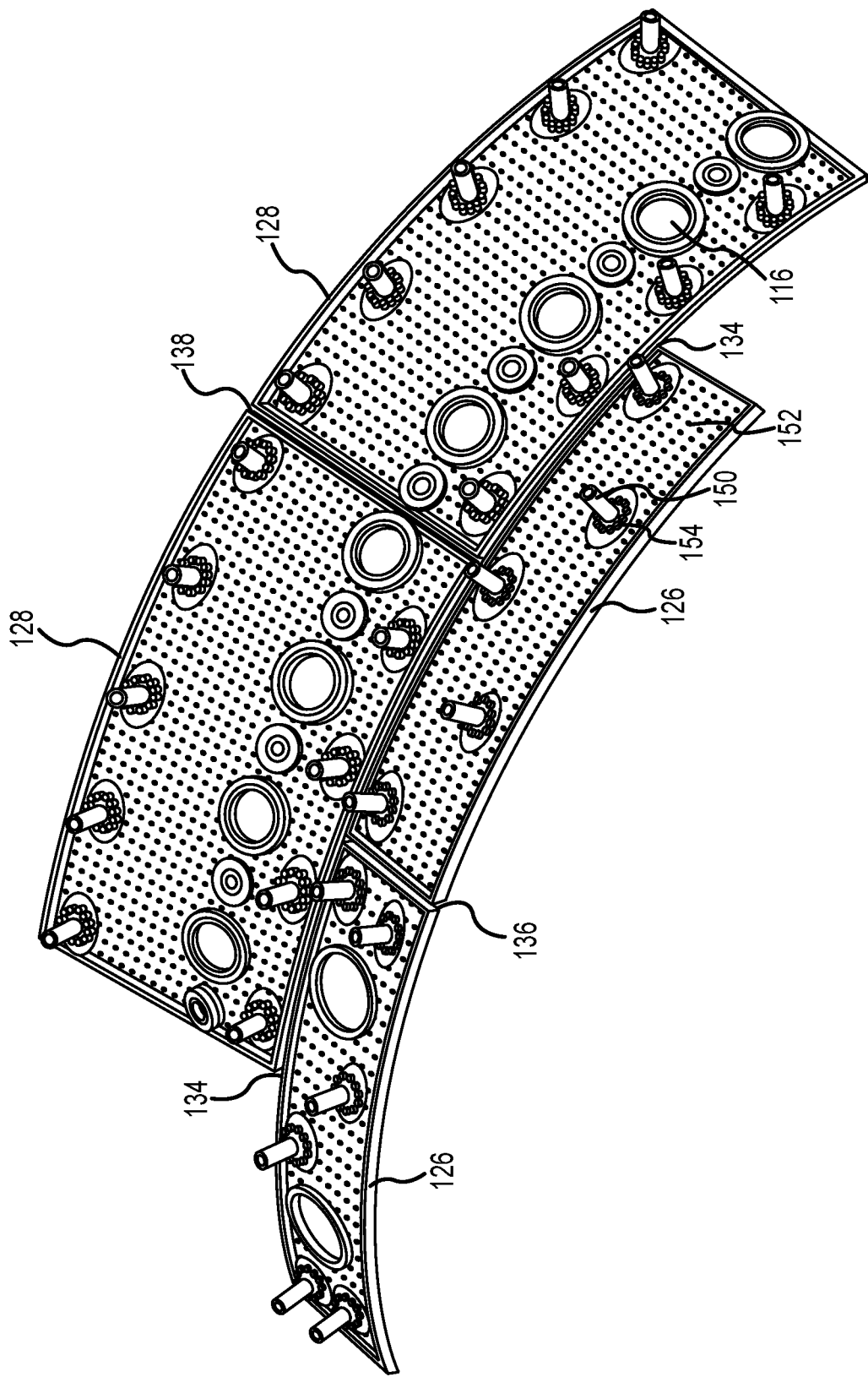
FIG. 1C is a perspective schematic view of a heat shield liner arrangement of a combustor, viewing from the cold side, according to various embodiments.

Turning now to FIG. 1C (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1C is the plurality of orifices 116, that may include dilution holes or air feed holes of various dimension.

Still referring to FIG. 1C, each of the circumferentially adjacent first panels 126 and the circumferentially adjacent second panels 128 include one or more studs 150 extending radially from a cold side surface 152 of the panels. Each of the studs 150 is surrounded by a plurality of standoff pins 154. The standoff pins typically serve to space the cold side surface 152 of the liners from respective support shells, such as the outer support shell 76 and the inner support shell 78 illustrated in FIG. 1B. In various embodiments, the standoff pins 154 may be densely packed and separated by a distance typically less than a characteristic distance (e.g., the diameter) of each of the standoff pins 154. The densely packed grouping of the standoff pins 154 provides a robust circular base with which to secure the panels to the shells without experiencing undesired deformation of the panels or the shells, either during assembly or during operation. The densely packed grouping, however, may prevent challenges during fabrication of the panels, particularly where the fabrication involves a casting process.

Figure 2A:
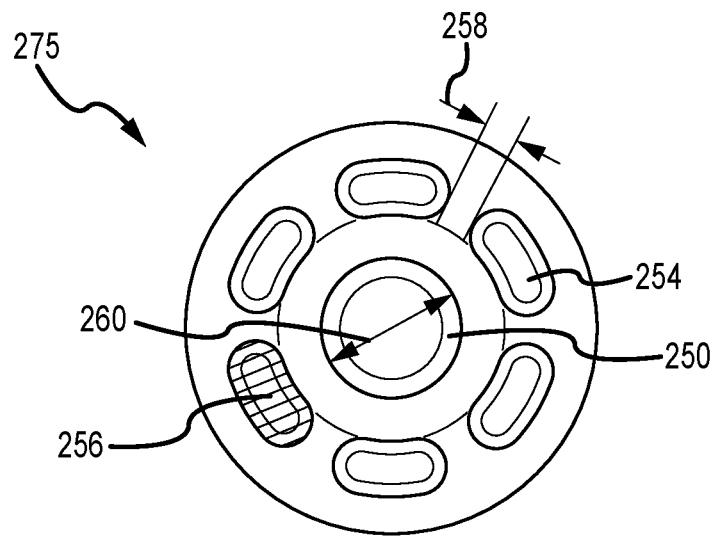
FIGS. 2A and 2B are overhead and perspective schematic views of an attachment mechanism, according to various embodiments.
Figure 2B:
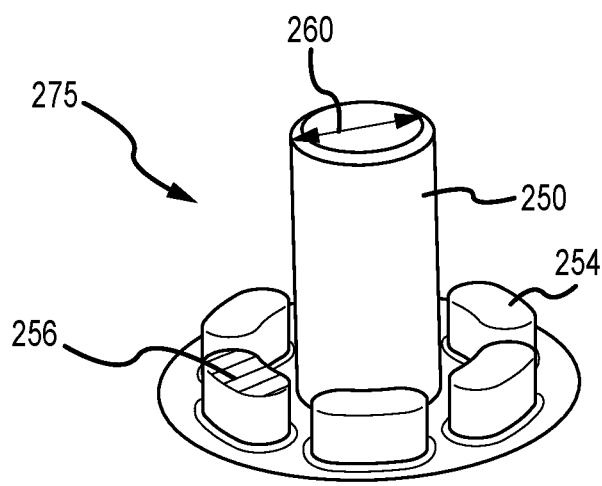

Referring now to FIGS. 2A and 2B, a stud 250 is illustrated surrounded by a plurality of standoff pins 254. The stud 250 may form part of an attachment mechanism 275, such as one of the attachment mechanisms 75 illustrated in FIG. 1B. As described further below with reference to FIG. 3, each of the plurality of standoff pins 254 is generally oval shaped when viewed from a radial direction (i.e., when viewed in an axial direction of the stud 250). The plurality of standoff pins 254 associated with each stud 250 provides a robust circular base with which to secure the liners to the shells. Each of the plurality of standoff pins 254 includes a contact surface 256 configured for abutting contact with the surface of an adjacent support shell, such as the outer support shell 76 and the inner support shell 78 illustrated in FIG. 1B. In various embodiments, the sum of the cross sectional areas of each contact surface 256 is equal to or approximately equal to the sum of the cross sectional areas of each of the similarly defined contact surfaces appearing in the densely packed grouping of the standoff pins 154 illustrated in FIG. 1C. A standoff spacing 258 between the standoff pins 254, relatively larger than a similar standoff spacing between the standoff pins 154 illustrated in FIG. 1C, however, advantageously facilitates fabrication of the liners upon which the standoff pins 254 are incorporated, particularly where a casting process is used to fabricate the liners and the standoff pins 254 are formed integrally with the cold side surface of the liners during the casting process. Still referring to FIGS. 2A and 2B, the stud 250 is generally cylindrical, with a diameter 260 sized to secure the liners to corresponding shells.

Figure 3:
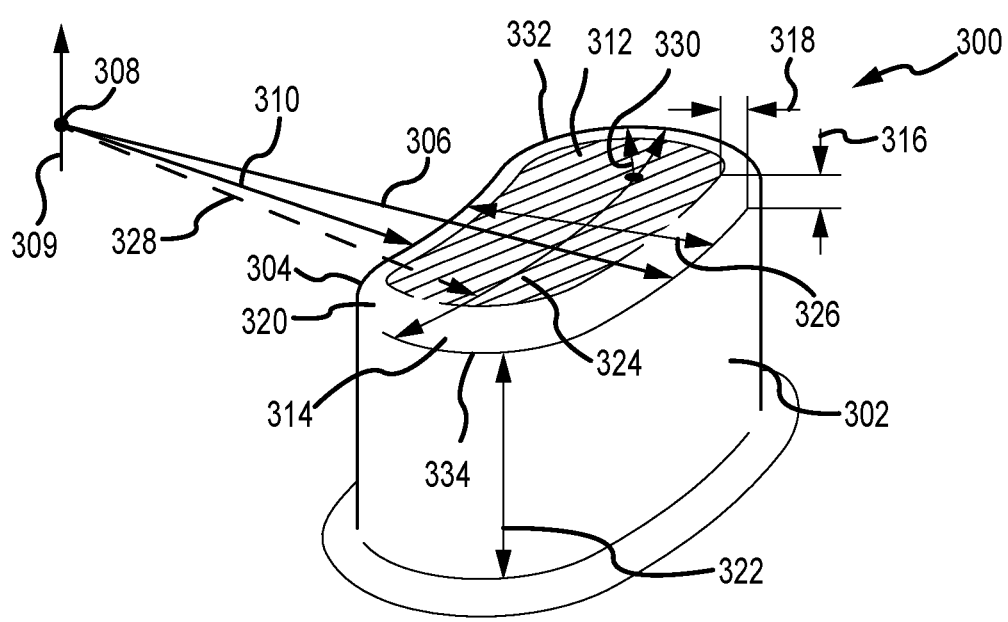
FIG. 3 is a perspective schematic view of standoff pin employed in an attachment mechanism, according to various embodiments.

Referring now to FIG. 3, a standoff pin 300 is illustrated, in accordance with various embodiments. The standoff pin 300 includes a radially outer surface 302 and a radially inner surface 304. The radially outer surface 302 is generally arcuate, having a generally straight-sided surface with a radially convex curvature, and may be described by an outer radius of curvature 306, having an origin 308 positioned on a central axis 309. In various embodiments, the central axis 309 is positioned to run axially through a corresponding stud, such as the stud 250 illustrated with reference to FIGS. 2A and 2B. Similarly, the radially inner surface 304 is generally arcuate, having a generally straight-sided surface with a radially concave curvature, and may be described by an inner radius of curvature 310, having its origin 308 positioned on the central axis 309 which, similar to the foregoing, may be positioned axially through the corresponding stud. In various embodiments, the central axis 309 may be positioned a distance away from the corresponding stud, such that, in the limit of increasing distance, a cross sectional shape (in an axial direction) of the standoff pin 300 assumes an oval shape—i.e., in the limit of increasing distance between the central axis 309 and the origin 308 from the standoff pin 300, the radially outer surface 302 and the radially inner surface 304 of the standoff pin 300 may be characterized by vanishingly small curvature and, in the limit, the standoff pin 300 may assume a substantially oval cross sectional shape.

In various embodiments, the standoff pin 300 includes a contact surface 312, configured for abutting contact with the surface of an adjacent support shell. In various embodiments, the standoff pin 300 further includes a transition portion 314, where the generally straight sides of the radially outer surface 302 and the radially inner surface 304 transition to the contact surface 312. In various embodiments, the transition portion 314 may be defined by a transition height 316 and a transition width 318, both of which are substantially constant about an outer periphery 320 of the standoff pin 300. In various embodiments, the transition portion 314 is curved, providing a smooth transition between the contact surface 312 and the radially outer surface 302 and the radially inner surface 304. In various embodiments, the transition height 316 and the transition width 318 approach zero in values, providing a substantially two-dimensional cross sectional dimension for the standoff pin 300 along an axial length 322 of the pin. The standoff pin 300 may be further defined by a circumferential dimension 324 or circumferential extent and a radial dimension 326 or radial extent, in addition to the axial length 322 and the standoff spacing 258 (see FIG. 2A). The circumferential dimension 324 is measured at the midpoint of the radial dimension 326 and is generally spaced a radial distance 328 from the origin 308. Additionally, the standoff pin 300 may be defined by a circumferential radius of curvature 330, both along a first circumferential end 332 of the standoff pin 300 and along a second circumferential end 334 of the standoff pin 300.

In various embodiments, the circumferential dimension 324 has a value from about two (2) times the standoff spacing 258 to about three (3) times the standoff spacing 258 and the radial dimension 326 has a value from about one (1) times the standoff spacing 258 to about two (2) times the standoff spacing 258. In various embodiments, the inner radius of curvature 310 of the standoff pin 300 has a value from about two (2) times the standoff spacing 258 to about three (3) times the standoff spacing 258, while the outer radius of curvature 306 has a value from about three (3) times the standoff spacing 258 to about four (4) times the standoff spacing 258. In various embodiments, the radial distance 328 from the origin 308 to the circumferential dimension 324 has a value from about two (2) times the standoff spacing 258 to about five (5) times the standoff spacing 258. In various embodiments, the circumferential radius of curvature 330 has a value from about one-quarter (¼) times the radial dimension 326 to about one (1) times the radial dimension 326 and, in various embodiments, the circumferential radius of curvature 330 has a value equal to about one-half (½) times the radial dimension 326.

In various embodiments, the axial length 322 has a value less than the value of the standoff spacing 258. In various embodiments, the axial length 322 has a value from about 0.045 inches (1.143 mm) to about 0.065 inches (1.651 mm), while the standoff spacing 258 has a value from about 0.070 inches (1.778 mm) to about 0.080 inches (2.032 mm). In various embodiments, the axial length 322 has a value from about 0.050 inches (1.270 mm) to about 0.060 inches (1.524 mm), while the standoff spacing 258 has a value from about 0.072 inches (1.828 mm) to about 0.076 inches (1.930 mm). In various embodiments, the axial length 322 has a value of about 0.055 inches (1.397 mm), while the standoff spacing 258 has a value of about 0.074 inches (1.879 mm). The foregoing values are selected to tend to maximize the cross sectional area of the contact surface 312 of each standoff pin 300 while also maximizing the standoff spacing 258 between each standoff pin 300.

Figure 4A:
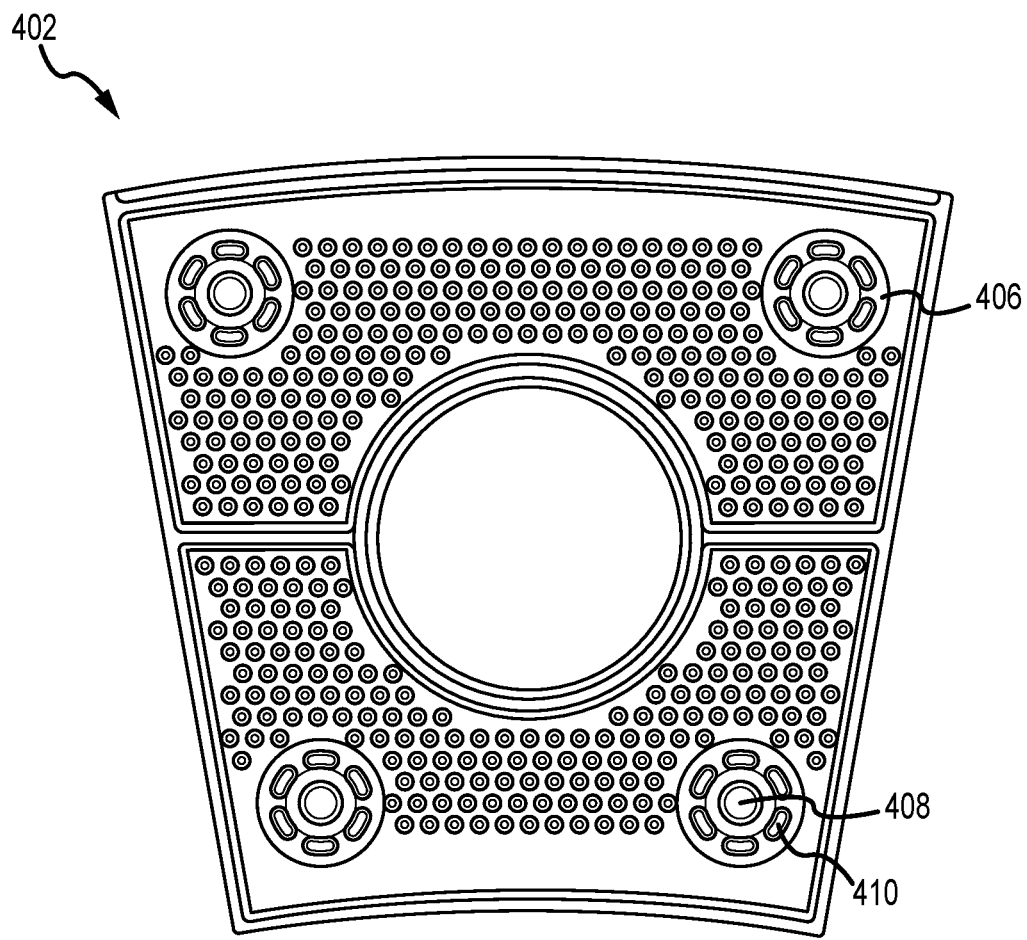
FIGS. 4A and 4B are schematic views illustrating attachment mechanisms and standoff pins positioned on a bulkhead liner and an outer liner, respectively, in accordance with various embodiments.
Figure 4B:
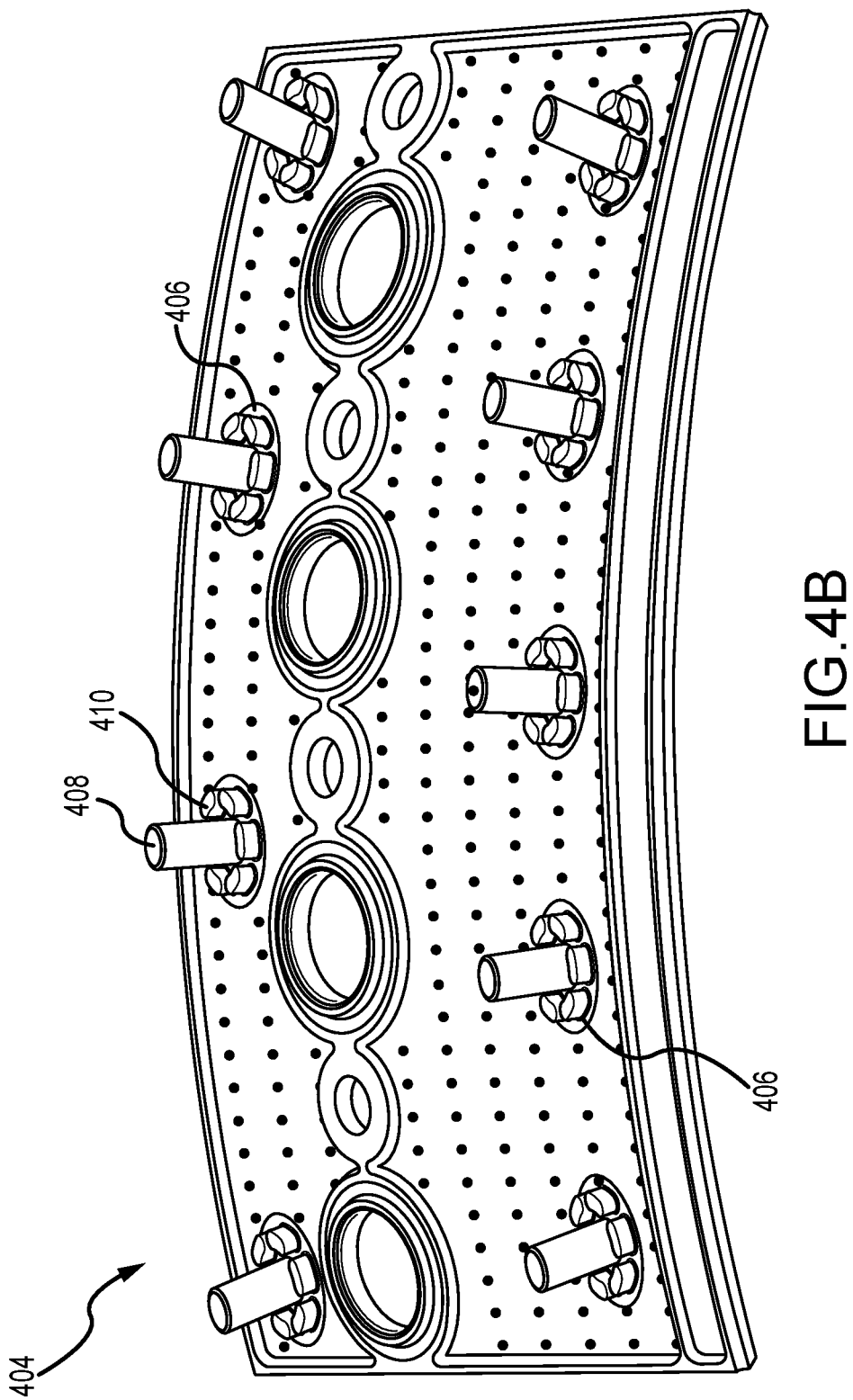

Referring now to FIGS. 4A and 4B, a bulkhead heat shield panel 402 (FIG. 4A) and an outer heat shield panel 404 (FIG. 4B) are illustrated as including attachment mechanisms 406 as described above with reference to FIGS. 2A and 2B. The bulkhead heat shield panel 402 may be similar to one of the bulkhead panels 98 illustrated in FIG. 1B and the outer heat shield panel 404 may be similar to one of the outer panels 80 illustrated in FIG. 1B or one of the circumferentially adjacent first panels 126 and circumferentially adjacent second panels 128 illustrated in FIG. 1C. As described above, each of the attachment mechanisms 406 includes a stud 408 and a plurality of standoff pins 410. The stud 408 and the plurality of standoff pins 410 include each of the characteristics described above with reference to FIGS. 2A, 2B and 3. In assembling a combustor, such as the combustor 56 illustrated in FIG. 1B, the bulkhead heat shield panel 402 and the outer heat shield panel 404 are secured via the attachment mechanisms 406 to the outer support shell 76 and the bulkhead support shell 96, respectively, also illustrated in FIG. 1B. Similar attachment mechanisms are used to secure the inner panels 82 to the inner support shell 78, as illustrated in FIG. 1B.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel for use in a gas turbine engine combustor, comprising:
   a hot side;
   a cold side; and
   at least one attachment mechanism, the at least one attachment mechanism having a stud and a central axis extending through the stud and a plurality of standoff pins positioned circumferentially around the stud, the standoff pins having a radial extent with respect to the central axis, a circumferential extent with respect to the central axis that is greater than the radial extent, a radially outer surface having a radially convex shape and a radially inner surface having a radially concave shape with respect to the central axis, each of the standoff pins defining a first circumferential radius of curvature at a first circumferential end and a second circumferential radius of curvature at a second circumferential end.

2. The heat shield panel of claim 1, wherein the radially outer surface is defined by an outer radius of curvature.

3. The heat shield panel of claim 2, wherein the radially inner surface is defined by an inner radius of curvature.

4. The heat shield panel of claim 3, wherein the inner radius of curvature has an inner value with respect to the central axis and the outer radius of curvature has an outer value and the outer value is greater than the inner value.

5. The heat shield panel of claim 4, wherein the radially outer surface is substantially arcuate in a circumferential direction and straight-sided in an axial direction.

6. The heat shield panel of claim 5, wherein the radially inner surface is substantially arcuate in the circumferential direction and straight-sided in the axial direction.

7. The heat shield panel of claim 3, wherein the standoff pins include a contact surface and a transition portion connecting the contact surface to the radially outer surface and the radially inner surface.

8. The heat shield panel of claim 7, wherein the transition portion includes a transition height and a transition width.

9. The heat shield panel of claim 8, wherein the transition height and the transition width are substantially constant about an outer periphery of the standoff pins.

10. The heat shield panel of claim 3, wherein the standoff pins are separated by a standoff spacing in a circumferential direction.

11. The heat shield panel of claim 10, wherein the standoff pins have an axial height and wherein the standoff spacing has a value greater than the axial height.

12. The heat shield panel of claim 10, wherein the circumferential extent has a value within a range from about two times the standoff spacing to about three times the standoff spacing.

13. A heat shield liner for use in a gas turbine engine combustor, comprising:
    a panel having a hot side and a cold side, and
    at least one attachment mechanism connected to the cold side of the panel, the at least one attachment mechanism having a stud and a central axis extending through the stud and a plurality of standoff pins positioned circumferentially around the stud, wherein each of the plurality of standoff pins have a radial extent with respect to the central axis, a circumferential extent with respect to the central axis that is greater than the radial extent, and are separated by a standoff spacing in a circumferential direction, and wherein the circumferential extent of the standoff pins has a value from about two times to about three times the standoff spacing, each of the standoff pins having a radially outer surface having a radially convex shape and a radially inner surface having a radially concave shape with respect to the central axis and defining a first circumferential radius of curvature at a first circumferential end and a second circumferential radius of curvature at a second circumferential end.

14. The heat shield liner of claim 13, further comprising a shell, wherein the panel is secured to the shell by the at least one attachment mechanism and wherein the plurality of standoff pins include a contact surface abutting the shell.

15. The heat shield liner of claim 14, wherein the radially outer surface is defined by an outer radius of curvature, the radially inner surface is defined by an inner radius of curvature, the inner radius of curvature has an inner value with respect to the central axis and the outer radius of curvature has an outer value with respect to the central axis and the outer value is greater than the inner value.

16. A heat shield panel for use in a gas turbine engine combustor, comprising:
- a hot side;
- a cold side; and
- at least one attachment mechanism, the at least one attachment mechanism comprising:
    - a stud having a central axis and
    - a plurality of standoff pins positioned circumferentially around the stud, the standoff pins having a height,
    - wherein the plurality of standoff pins each have a radial extent with respect to the central axis and a circumferential extent with respect to the central axis that is greater than the radial extent,
    - wherein the standoff pins are separated there between by a standoff spacing and the height of the standoff pins is less than the standoff spacing, each of the standoff pins having a radially outer surface having a radially convex shape and a radially inner surface having a radially concave shape with respect to the central axis and defining a first circumferential radius of curvature at a first circumferential end and a second circumferential radius of curvature at a second circumferential end.

17. The heat shield panel of claim 16, wherein the standoff pins have a radial dimension having a value within a range from about one times the standoff spacing to about two times the standoff spacing.

\* \* \* \* \*